(12) United States Patent
Yang

(10) Patent No.: US 6,931,882 B1
(45) Date of Patent: Aug. 23, 2005

(54) DUAL FUNCTION CONDENSATE DRAIN TRAP FOR NEGATIVE OR POSITIVE PRESSURE AIR HANDLING UNIT

(76) Inventor: Sam Yang, 10F-4, No. 634-9, Jingping Rd., Zhonghe City, Taipei County (TW)

( * ) Notice: Subject to any disclaimer, the term of this patent is extended or adjusted under 35 U.S.C. 154(b) by 0 days.

(21) Appl. No.: 10/860,023

(22) Filed: Jun. 4, 2004

(51) Int. Cl.⁷ ............................................. F25D 21/14
(52) U.S. Cl. .......................................... 62/285; 62/291
(58) Field of Search ........................... 62/285, 286, 288, 62/291

(56) References Cited

U.S. PATENT DOCUMENTS 4,856,550 A * 8/1989 Smelcer ...................... 137/192
5,115,798 A * 5/1992 Moore et al. ............... 122/14.1

* cited by examiner

*Primary Examiner*—Melvin Jones
(74) *Attorney, Agent, or Firm*—Birch, Stewart, Kolasch & Birch, LLP

(57) ABSTRACT

A dual function condensate drain trap for positive or negative pressure air handling unit applicable in positive or negative pressure environments by switching connecting directions includes a drain trap which has a water inlet and a water outlet on two sides to connect to a drain pipe, and a valve seat and a retaining element located on the valve seat movable between a first position to be in contact with the valve seat and a second position to be away from the valve seat. When the pressure of water column in the water inlet is smaller than that of the water outlet, the retaining element is on the first position to form an air lock to prevent air from entering or escaping from air handling unit. By contrast, when the pressure of water column in the water inlet is greater than that of the water outlet, the retaining element is moved to the first position to drain water.

6 Claims, 6 Drawing Sheets

DUAL FUNCTION CONDENSATE DRAIN TRAP FOR NEGATIVE OR POSITIVE PRESSURE AIR HANDLING UNIT

FIELD OF THE INVENTION

The present invention relates to a dual function condensate drain trap for negative or positive pressure air handling unit (or positive or negative pressure air ducts) and particularly to using a float ball as a drain trap to drain the water and form an air lock to prevent air entering or escaping from an air handling unit.

BACKGROUND OF THE INVENTION

These days a great number of high rise buildings have been constructed. They are mostly designed with a sealed space. Hence air conditioning system is very important for those buildings.

An A/C system generally equipped with a negative pressure (draw through type) air handling unit or positive pressure (blow through type) air handling unit, the drain pan outlet should be on the downstream side of the coil. A conventional condensate drain trap.

Please refer to FIG. 1, an air handling unit 1a which is mounted onto a foundation base 3a and coupled with a trap 2a on one side. The trap 2a generally is a U-shape siphon and a leg of the trap 2a must be at least long enough so the column of water in the trap 2a will overcome the fan pressure in the coil plenum, if the leg of the trap 2a is too shot on a negative-pressure drain, water will not flow out the drain but will accumulate and eventually overflow the drain pan. On a positive-pressure drain, insufficient trap leg length will allow air to flow out of the drain continuously.

Although the conventional structure set forth above can be function as a condensate drain trap but still have problems, notably:

1. The leg of the trap 2a must be long enough, and the height of the foundation base 3a has to be carefully set. Otherwise drain quality will be affected.
2. The trap outlet pipe can't lay on the floor, elevation difference between the drain pipe and the ground surface is not convenience for drain line installation.
3. The U-shape trap tends to accumulate dirt that is difficult to inspect and clean.

To remedy the foregoing disadvantages, another kind of condensate drain trap for positive or negative pressure air handling unit has been developed as shown in FIG. 2. It has a water drain valve 1 with two sides connecting to a water inlet 11 and a water outlet 12. The water inlet 11 and the water outlet 12 are joined at a juncture which houses an elastic element 13 to press a retaining element 14. Water may push the retaining element 14 and compress the elastic element 13 to open the water outlet 12 to drain water. Such a structure provides a condensate drain function for positive or negative pressure air handling unit, and makes cleaning easier. But the water drain outlet still is spaced from the ground surface at a great distance, and is inconvenient for drain line installation. As shown in the drawing, it needs a plurality of bolts 15 to fasten and anchor the retaining element 14 and the elastic element 13. Water drain is controlled by the elastic element 13. Hence design of the elastic element 13 has to be precise. Moreover, elastic fatigue takes place as the elastic element 13 is subject to compression frequently. As a result, the retaining element 14 cannot block the water outlet 12 and external air will flow back into the air handling unit.

SUMMARY OF THE INVENTION

The primary object of the invention is to solve the aforesaid disadvantages. The present invention provides a new structure dual function condensate drain trap for positive or negative pressure air handling unit that is easy to install.

In order to achieve the foregoing object, the drain trap according to the invention has a water inlet and a water outlet located on two sides connecting to a drain pipe. The drain trap includes a valve seat and a retaining element resting on the valve seat. The retaining element is movable between a first position to be in contact with the valve seat in normal conditions and a second position to be not in contact with the valve seat. When the pressure of the water column of the water inlet is smaller than the pressure of the water outlet, the retaining element is located on the first position to form an "air lock", and air cannot enter or escape from the air handling unit. By contrast, when the pressure of the water column of the water inlet is greater than the pressure of the water outlet, the retaining element is moved to the second position to drain water.

Another object of the invention is to provide a drain trap that is easy to clean and inspect. The drain trap has an opening formed on an upper end to receive the retaining element. The opening is coupled with a cap which may be removed to facilitate cleaning and inspecting of drain conditions.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
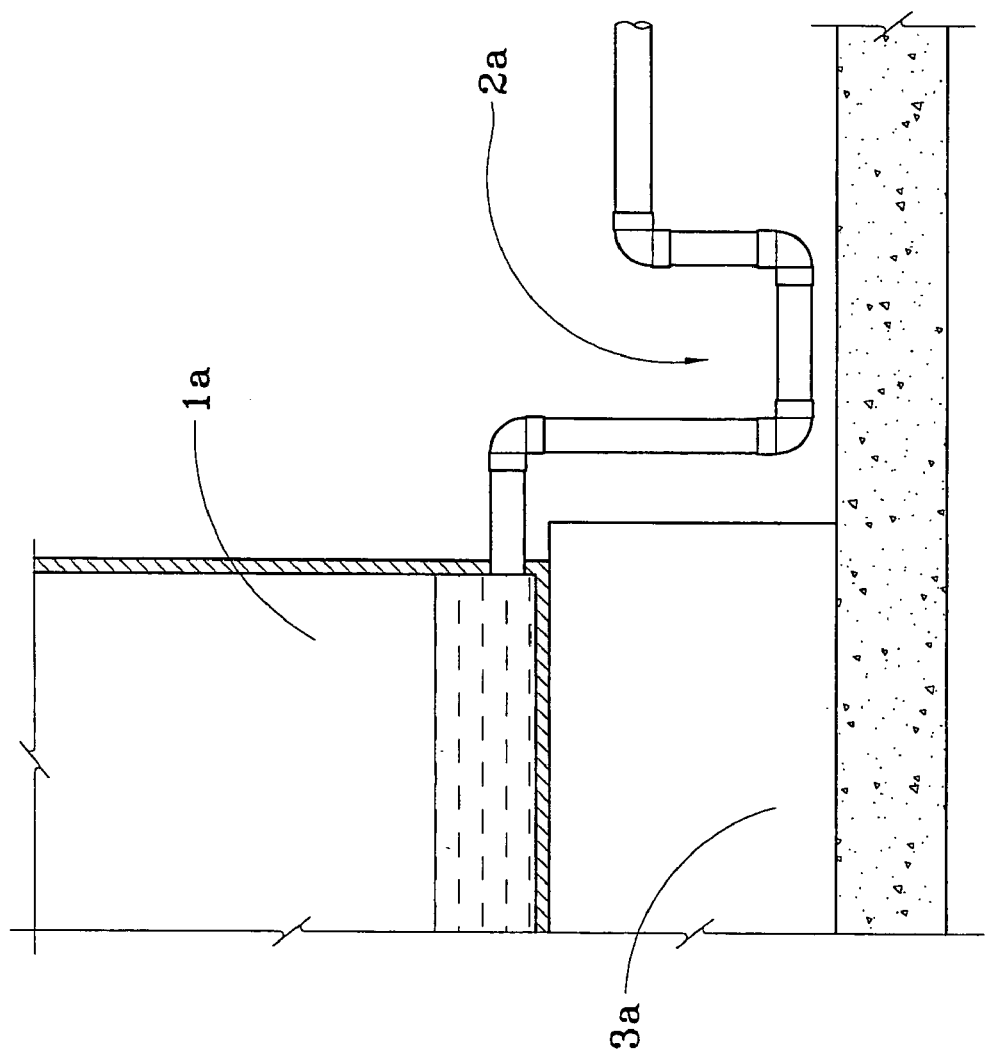
FIG. 1 is a schematic view of a conventional U-shape siphon drain trap in a use condition.
Figure 2:
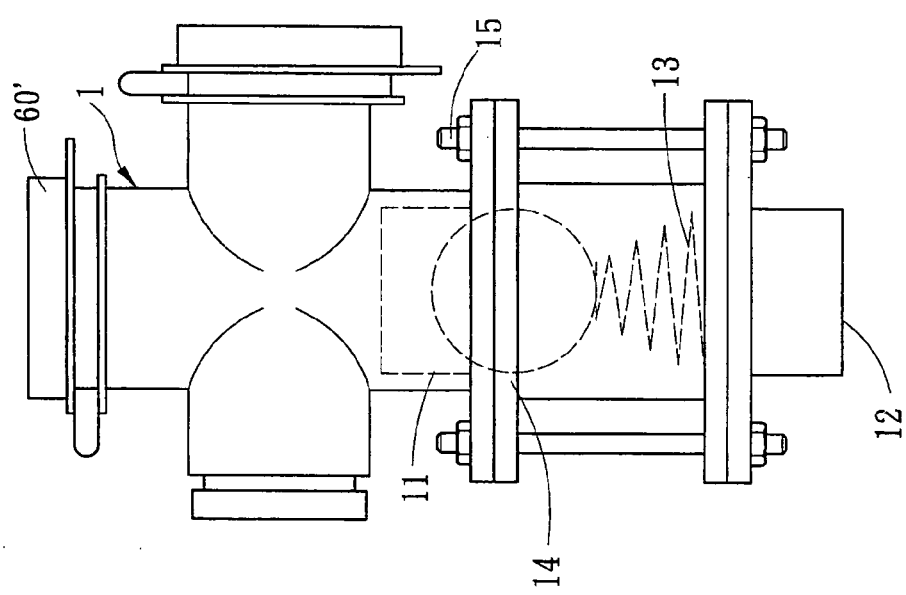
FIG. 2 is a schematic view of another kind structure of a conventional drain trap.
Figure 3:
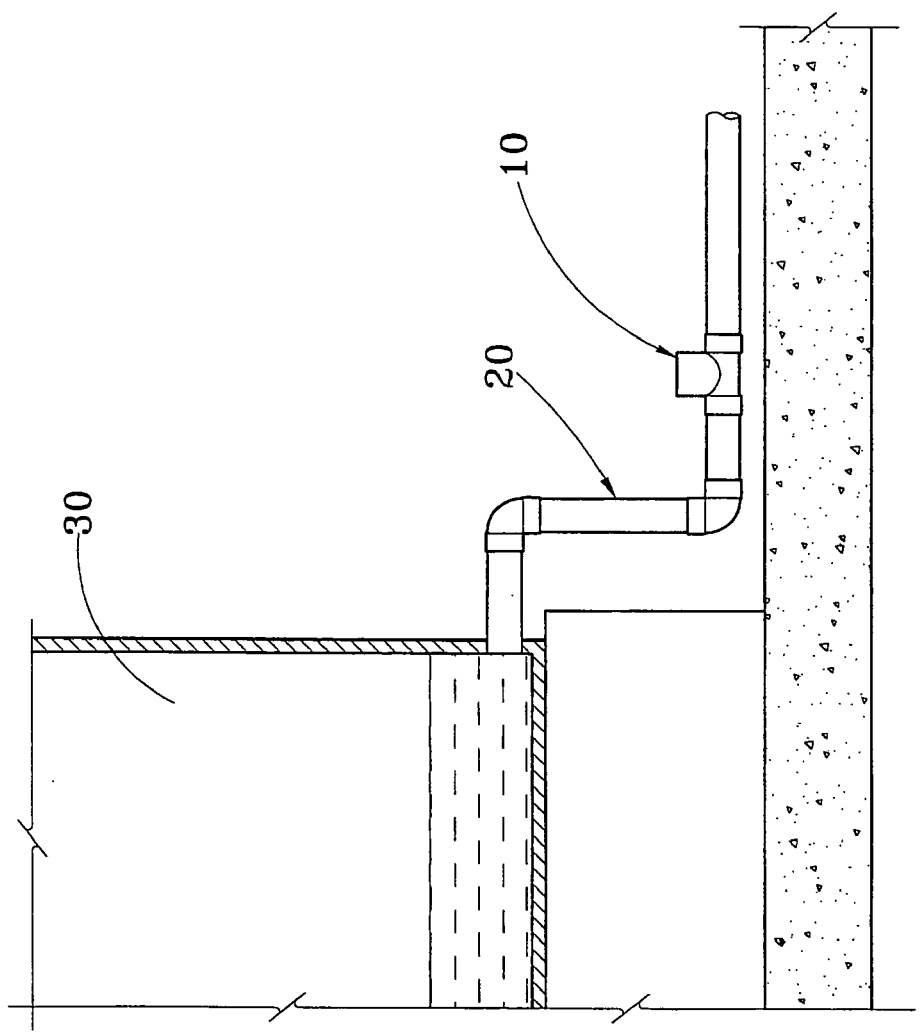
FIG. 3 is a schematic view of the invention in a use condition.
Figure 4:
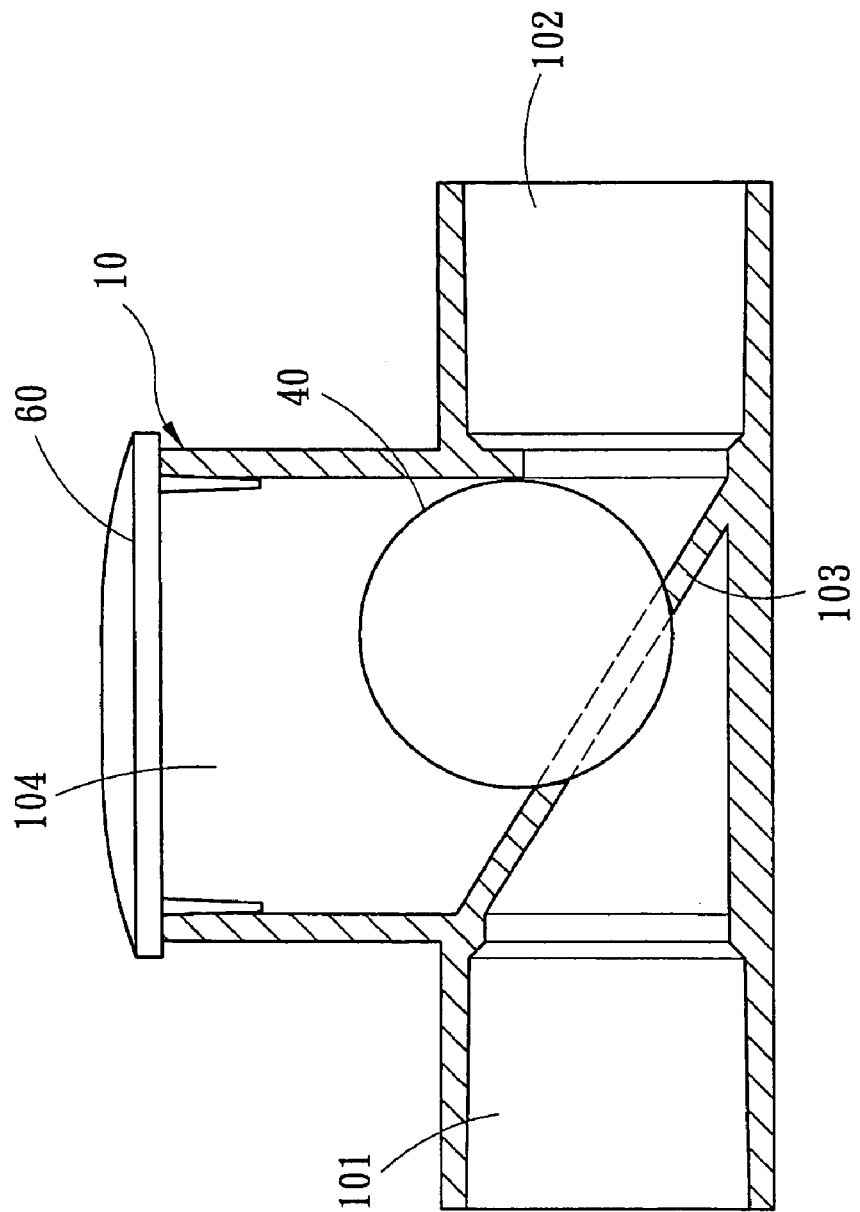
FIG. 4 is a sectional view of the drain trap of the invention.

Please referring to FIGS. 3 and 4, the condensate drain trap for positive or negative pressure air handling unit according to the present invention includes a drain trap 10 connecting to a drain pipe 20 that are located on one side of an air handling unit 30 for drain the condensate water and preventing air from flowing into or out of the air handling unit 30.

The drain trap 10 has a water inlet 101 and a water outlet 102 on two sides to connect to the drain pipe 20 by adhesive bonding. The drain trap 10 further has a valve seat 103 located therein communicating with the water inlet 101 and the water outlet 102. On the valve seat 103 there is a retaining element 40 in contact with the valve seat 103 in normal conditions at a first position.

The drain trap 10 may be made from thermal setting material such as PVC, PE, PP or the like that have a desired allowance, or metal with a desired toughness such as copper or iron. The drain trap 10 is coupled with an extension of the drain pipe 20 that is in parallel with the ground surface 50. It controls water flow through the retaining element 40 and prevents air from entering or escaping from air handling unit 30. The drain trap 10 has an opening 104 on a upper end to receive the retaining element 40 and couple with a cap 60. The cap 60 may be removed for cleaning the trap and inspecting drain condition.

Figure 5A:
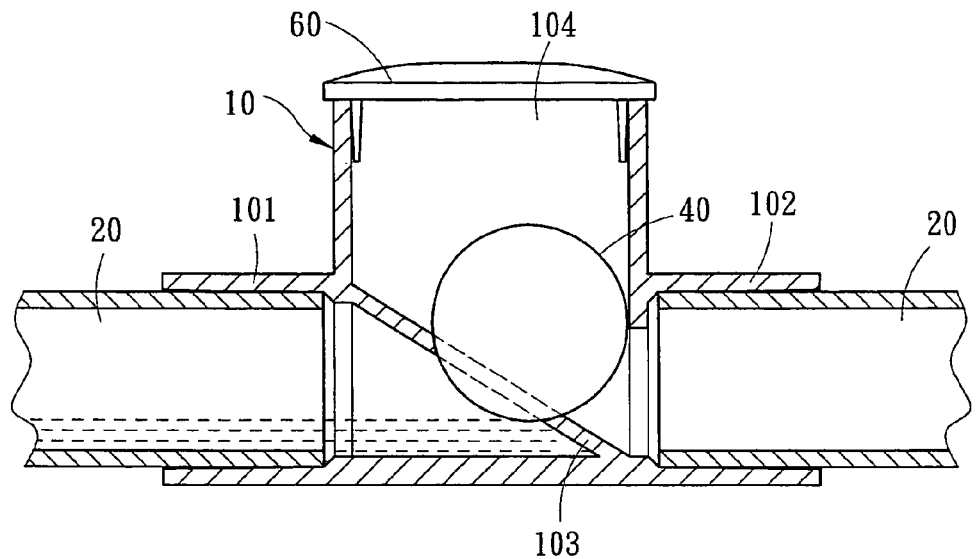
FIGS. 5A and 5B are schematic views of the drain trap in operating conditions with the negative pressure air handling unit.
Figure 5B:
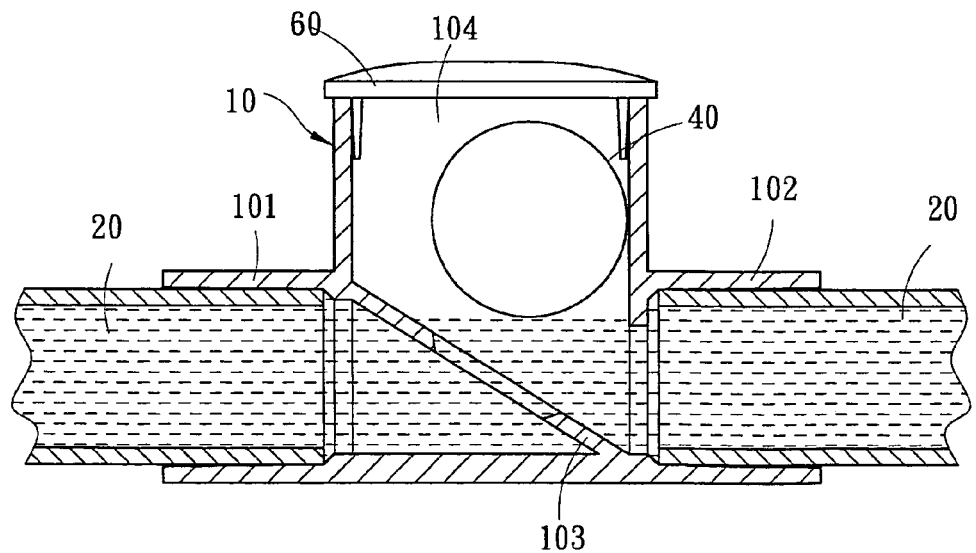

Refer to FIGS. 5A and 5B for the invention in use with a negative pressure (draw through type) air handling unit. The water inlet 101 and water outlet 102 of the drain trap 10 are connected to drain pipe 20. When there is no water in the drain pipe 20, the water inlet 101 is in a negative pressure condition (namely the pressure is less than the external atmospheric pressure). The retaining element 40 is located at the first position to form air lock to prevent external air from flowing into the air handling unit 30. When the condensate water from air handling unit 30 increases and the pressure of the water column in the drain pipe 20 is greater than the internal negative pressure of the air handling unit 30, the retaining element 40 is moved to a second position due to the buoyant force so that water flows out through the valve seat 103. When the water flow in the drain pipe 20 decreases gradually, the retaining element 40 drops and rests on the valve seat 103 at the first position due to absence of the water buoyant force and the suction of the negative pressure of the air handling unit 30, and the air lock is formed again to prevent external air from entering into the air handling unit 30 and wait for water drain of the next cycle.

Figure 6A:
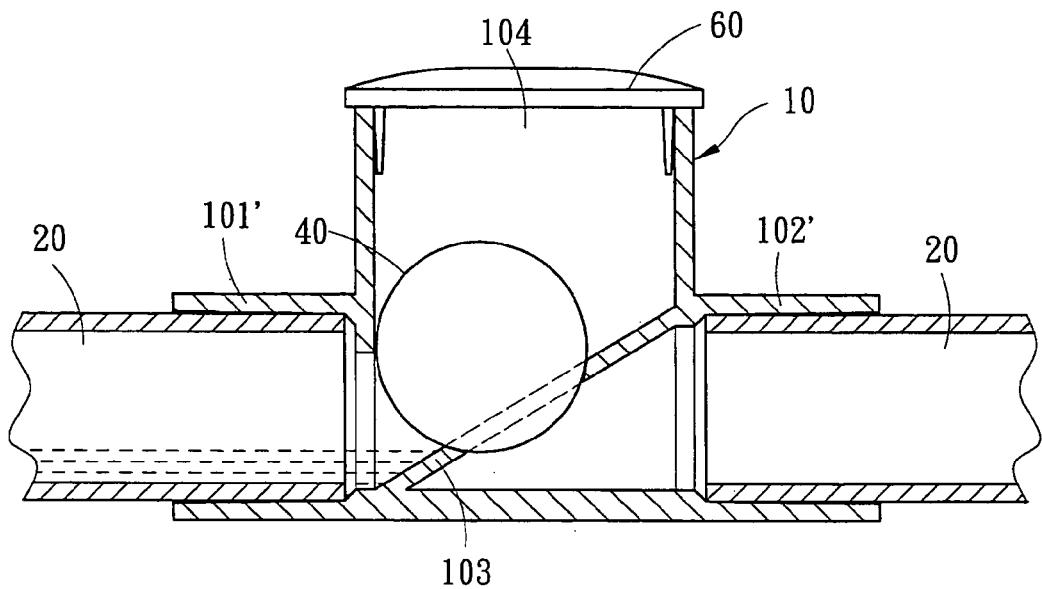
FIGS. 6A and 6B are schematic views of the drain trap in operating conditions with the positive pressure air handling unit.
Figure 6B:
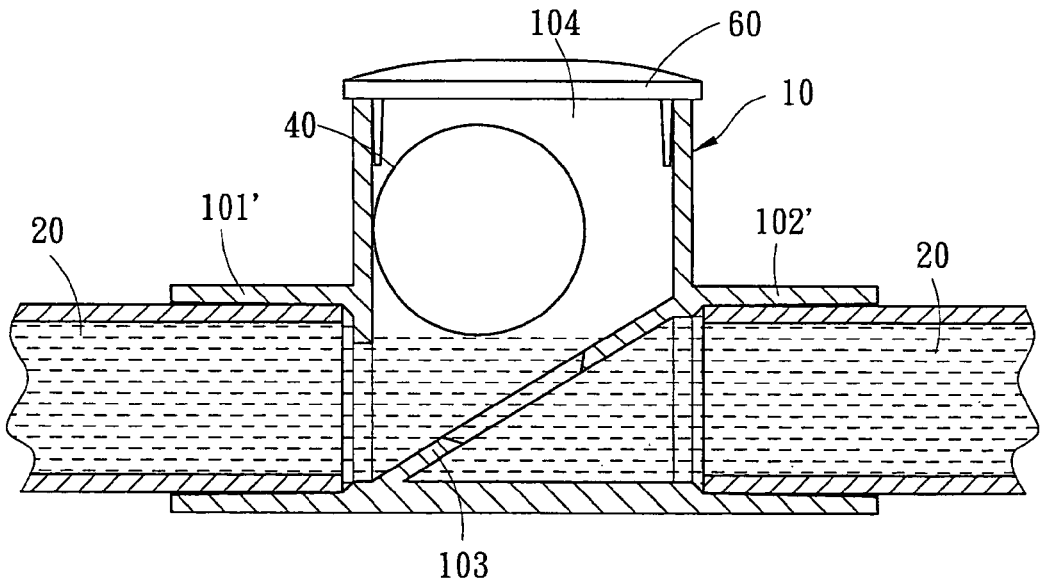

Refer to FIGS. 6A and 6B for the invention in use with a positive pressure (blow through type) air handling unit. The air handling unit 30 is in a positive pressure condition (namely greater than the external atmospheric pressure) and mounted onto the foundation base. Its structure is same as the one shown in FIG. 3. However the water inlet 101 and water outlet 102 of the drain trap 10 are inverse and connected to two drain pipes 20. The former water inlet 101 becomes the water outlet 102', and the former water outlet 102 becomes the water inlet 101'. When there is no water in the drain pipe 20, the pressure of the water inlet 101' is greater than the pressure of the water outlet 102'. The retaining element 40 is located at the first position to close the valve seat 103 and form an air lock to prevent cold air leakage from air handling unit 30. When water in the drain pipe 20 increases gradually, the retaining element 40 is moved to the second position by the water buoyant force and the positive pressure of the air handling unit 30 to allow condensate water drain out. By the same token, when the water in the drain pipe 20 decreases gradually, the retaining element 40 moves back to the first position to form an air lock to prevent the cold air leakage of the air handling unit 30.

What is claimed is:

1. A dual function condensate drain trap for positive or negative pressure air handling unit or positive or negative pressure air duct connected to a drain pipe and located on one side of an air handling unit to prevent air from flowing in or flowing out and to drain condensate water, comprising:
   the drain trap having a water inlet and a water outlet located on two sides connecting to a drain pipe, the drain trap including a valve seat and a retaining element resting on the valve seat, the retaining element being movable between a first position to be in contact with the valve seat in normal conditions and a second position to be not in contact with the valve seat, when the pressure of the water column of the water inlet is smaller than the pressure of the water outlet, the retaining element being located on the first position, to form an air lock and so that air cannot enter or escape from the air handling unit, when the pressure of the water column of the water inlet is greater than the pressure of the water outlet, the retaining element being moved to the second position to drain water, the drain trap being coupled with an extension of the drain pipe that is in parallel with a ground surface;
   wherein by changing the drain trap connection port, the drain trap is selectively used with positive or negative pressure.

2. The dual function condensate drain trap of claim 1, wherein the drain trap is made from thermal setting material including PVC, PE, and PP that have a desired allowance, or metal including copper and iron that have a desired toughness.

3. The dual function condensate drain trap of claim 1, wherein the water inlet and the water outlet are coupled with the drain pipe by adhesive bonding.

4. The dual function condensate drain trap of claim 1, wherein the drain trap has the valve seat being sloped and to receive the retaining element, the drain trap has an opening formed on an upper end to receive the retaining element, the opening being coupled with a cap which may be removed to facilitate cleaning and inspecting of drain conditions.

5. A dual function condensate drain trap for positive or negative pressure air handling unit or positive or negative pressure air duct connected to a drain pipe and located on one side of an air handling unit to prevent air from flowing in or flowing out and to drain condensate water, comprising:
   the drain trap having a water inlet and a water outlet located on two sides connecting to a drain pipe, the drain trap including a valve seat and a retaining element resting on the valve seat, the retaining element being movable between a first position to be in contact with the valve seat in normal conditions and a second position to be not in contact with the valve seat, when the pressure of the water column of the water inlet is smaller than the pressure of the water outlet, the retaining element being located on the first position, to form an air lock so that air cannot enter or escape from the air handling unit, when the pressure of the water column of the water inlet is greater than the pressure of the water outlet, the retaining element being moved to the second position to drain water, the water inlet and the water outlet being coupled with the drain pipe by adhesive bonding;
   wherein by changing the drain trap connection port, the drain trap is selectively positive or negative pressure used.

6. A dual function condensate drain trap for positive or negative pressure air handling unit or positive or negative pressure air duct connected to a drain pipe and located on one side of an air handling unit to prevent air from flowing in or flowing out and to drain condensate water, comprising:
   the drain trap having a water inlet and a water outlet located on two sides connecting to a drain pipe, the drain trap including a valve seat and a retaining element resting on the valve seat, the retaining element being movable between a first position to be in contact with the valve seat in normal conditions and a second position to be not in contact with the valve seat, when the pressure of the water column of the water inlet is smaller than the pressure of the water outlet, the retaining element being located on the first position, to form an air lock so that air cannot enter or escape from the air handling unit, when the pressure of the water column of the water inlet is greater than the pressure of the water outlet, the retaining element being moved to the second position to drain water, the drain trap having the valve seat being sloped and to receive the retaining element, the drain trap having an opening formed on an upper end to receive the retaining element, the opening being coupled with a cap which is removable to facilitate cleaning and inspecting of drain conditions;

wherein by changing the drain trap connection port, the drain trap is selectively positive or negative pressure used.

* * * * *